United States Patent [19]

McDougal

[11] Patent Number: 4,821,697
[45] Date of Patent: Apr. 18, 1989

[54] FUEL OCTANE EVALUATION SYSTEM

[76] Inventor: John A. McDougal, 14388 Harbor Island, Detroit, Mich. 48215

[21] Appl. No.: 85,476

[22] Filed: Aug. 14, 1987

[51] Int. Cl.⁴ .............................................. F02P 5/145
[52] U.S. Cl. ................................. 123/425; 123/198 D; 123/435
[58] Field of Search .............. 123/425, 198 D, 198 A, 123/435; 73/866.3, 432.1, 113; 431/13, 16, 19, 356; 362/23, 77, 85; 340/500, 700

[56] References Cited

U.S. PATENT DOCUMENTS

| 4,019,489 | 4/1977 | Cartmill | 123/198 D |
| 4,116,173 | 9/1978 | McDougal et al. | 123/425 |
| 4,464,933 | 8/1984 | Santis | 73/866.3 |
| 4,494,404 | 1/1985 | Strifler | 73/113 |
| 4,594,983 | 6/1986 | Takahashi et al. | 123/435 |
| 4,619,236 | 10/1986 | Okada et al. | 123/435 |
| 4,630,584 | 12/1986 | Higashiyama et al. | 123/425 |

Primary Examiner—Raymond A. Nelli
Attorney, Agent, or Firm—Harness, Dickey & Pierce

[57] ABSTRACT

A system and method for optimizing the octane rating of fuel supplied to a vehicle. The system utilizes information resulting from the occurance of detonation to make recommendations regarding the fuel octane requirements of the vehicle to the operator of the vehicle. The system can reduce the occurance of detonation by advising the operator of the vehicle when a higher octane fuel is required. Also, unnecessary expense resulting from the use of an excessively high octane fuel can be avoided by advising the operator when a lower octane fuel should be used.

31 Claims, 3 Drawing Sheets

FUEL OCTANE EVALUATION SYSTEM

BACKGROUND OF THE INVENTION

The present invention relates generally to a system for controlling the occurence of detonation in internal combustion engines. More particularly, the present invention relates to a system which evaluates the suitability of the octane rating of the fuel used in a vehicle and makes comparative recommendations regarding the octane rating of fuel to be used.

In his 1964 book, "My Years With General Motors", Alfred P. Sloan wrote, "The central problem in automotive engineering has been to develop a more satisfactory relationship between the fuel and the engine." Since that time, considerable progress has been made in solving this problem. For example, applicant's U.S. Pat. No. 4,116,173 teaches the use of an accelerometer as an engine detonation sensor to distinguish detonation in individual cylinders of an engine, and to retard spark advance to those cylinders of the engine which are detonating. This scheme is currently being implemented using digital computers and is capable of making an engine somewhat adaptive to the octane rating of the fuel supplied to the engine.

A further improvement in the development of an engine that can adapt to fuel with different octane ratings may be found in U.S. Pat. No. 4,594,982, issued on June 17, 1986 to A. Takahashi et al., in U.S. Pat. No. 4,594,983, issued on June 17, 1986 to A. Takahashi et al., in U.S. Pat. No. 4,619,236, issued on Oct. 28, 1986 to T. Okada et al., in U.S. Pat. No. 4,630,584, issued on Dec. 23, 1986 to K. Higashiyaha et al., in U.S. Pat. No. 4,635,604, issued on Jan. 13, 1987 to T. Iwata et al. These five inventions utilize the occurance of engine detonation to indicate to the detonation control system the type of gasoline in use and thus permit the detonation control system to more optimally adapt its functioning to that type of gasoline.

It will be appreciated that there are performance tradeoffs to consider when controlling engine detonation. As a very rough rule of thumb, in the range between 1 and 10 degrees of detonation control system spark retard, each degree is worth one octane number in its capability to suppress detonation. However, each degree costs a 1% loss of engine torque. Beyond the first 10 degrees of such retard, the torque curves become steeper and the torque loss per degree becomes greater.

Because of the steep torque loss curve beyond 10 degrees, there is a practical lower limit to the range of fuel octane numbers over which an engine can be made self-adaptive. In modern electronic detonation control systems, this range is accounted for by limiting the range of authority over which the control system is permitted to retard spark advance in order to suppress detonation. See, for example, Meyer, "Austin-Rover Montego Programmed Ignition System", SAE Paper 841293. This paper describes British Leyland's Austin-Rover Montego programmed ignition system as having "a maximum correction of 20 degrees".

In practice, as long as the owner of an automobile uses fuel whose octane is above the lower limit which can be accommodated by the control system, the engine will automatically adapt and run without destructive detonation. If an owner supplies his vehicle with fuel which has an octane rating higher than necessary, the retard authority of his electronic detonation control system will seldom be invoked. It should be noted that the ideal octane rating will vary among different drivers because of differing driving habits, and differing attitudes regarding economy vs. performance.

Whatever the ideal octane rating is, the use of an excessively high octane fuel results in a needless economic penalty. The present incremental retail cost of an octane number as posted on gasoline filling station pumps is approximately five cents per octane number per gallon. When multiplied by the annual U.S. gasoline consumption of roughly one hundred billion gallons, five cents per octane number per gallon results in a national yearly cost of five billion dollars for each incremental octane number. Thus, there will be considerable economic waste if, nationwide, a fuel of only a slightly higher octane number than necessary is used. To further illustrate the economic importance of vehicle fuel expenditures, it should be noted that a recent national survey of household expenditures reported that, on average, household cost for vehicle fuel exceeded the total cost of all other household purchases of energy.

The vehicle owner, because he selects what fuel to use, could play an important role in preventing needless economic waste and in achieving a better relationship between the engine and the fuel. Currently, automobile manufacturers may print the value of recommended fuel octane number in owner's manuals for each model automobile. Unfortunately, this recommendation falls short of providing optimal guidance to the owner for a number of reasons. For example, when an automobile is driven on hilly roads or is used to pull a trailer, the automobile requires a higher octane fuel than it would in ordinary driving. Also, vehicles supposedly identical in design and construction have significant differences in their octane requirements. Moreover, octane requirement frequently increase with mileage as combustion chamber deposits accumulate and change with engine wear. For example, in Alquist "Some Observations of Factors Affecting ORI", SAE Paper No. 750932, it is reported that a difference of up to 6.9 octane numbers in initial octane requirement is observed when different (supposedly identical) cylinder head sets are used on the same clean V-8 engine.

Also, in Betts, "Improved Fuel Economy by Better Utilization of Available Octane Quality", SAE Paper 790940, the author reports that compression ratios varied by up to 1.5 compression ratios between examples of the same model engine, and that cylinders in the same engine varied by up to 1 compression ratio. These compression ratio variations directly affect the octane requirement of an engine. Further, Graiff, "Some New Aspects of Deposit Effects on Engine Octane Requirement Increase and Fuel Economy", SAE Paper 790938, reports a 13 octane number spread in the requirements of the individual cylinders of the same engine following about 200 hours of deposit accumulation.

Thus, it would be desirable to provide a means for advising the vehicle owner of desirable changes in the octane of the fuel which he has been using. This would not only improve the performance of his engine, but could also save the individual and the nation the needless expense of using excessively high octane fuel. This would require an intelligent, dynamic and personalized octane requirement computation which is tailored to an individual engine, its operational environment, and to individual driving habits.

Accordingly, it is a principal object of this invention to provide a system for an automobile that will help the driver optimize the octane rating of the fuel used by recommending desirable changes in the fuel octane rating.

It is also an object of this invention to prevent premature automobile engine wear and damage, by providing a system which will request a higher octane fuel when the octane of the fuel which has recently been consumed from the vehicle's tank is too low.

It is another object of this invention to provide a system for an automobile that will request a lower octane fuel when the prevailing octane of the fuel which has recently been consumed from the vehicle's tank is too high, and to thereby optimize dollar fuel economy.

It is an additional object of this invention to provide a system that will indicate to the driver when the prevailing octane grade of fuel which has recently been consumed from the vehicle's tank is generally correct.

It is also an object of this invention to provide a system that will automatically make recommendations regarding the correct octane fuel taking into account such factors as driver habits, vehicle loading, engine wear, combustion chamber deposits, and the many other factors influencing engine octane requirement.

SUMMARY OF THE INVENTION

Early electronic detonation control systems were intended only as a safety feature on aircraft engines to prevent engine damage due to detonation. More recently, these systems have become used in automobiles. One may consider that if the spark retard authority of an electronic detonation control system installed in an automobile is never invoked, the octane grade of fuel being utilized is too high for the prevailing conditions. The result is increased evaporated air pollution from the more volatile hydrocarbons used in higher octane fuels and economic waste. On the other hand, if the spark retard authority of an electronic detonation control system is frequently invoked and approaches or saturates at its maximum value of spark retard authority, the octane of the fuel is too low for prevailing conditions. Over the long term in such a situation, there is the likelihood of premature engine wear or damage.

Underutilization or overutilization of electronic detonation control spark retard authority can be detected as follows. A summation or accumulation of the magnitude of exercise of spark retard authority during a predetermined time period is compared with predetermined standard values. This time period may be based on real time or on various other measurement parameters such as engine revolutions or gallons of fuel consumed. If this summation or accumulation is below a predetermined minimum value, the octane of the fuel has been too high, relative to the driving conditions encountered during that period. If this summation or accumulation is above a predetermined maximum value, the electronic detonation control system is being invoked excessively and a higher octane fuel would be appropriate.

The vehicle driver may be advised of the results of this evaluation by means of displays or telltales. He may then use this information when selecting the octane grade of fuel to use. Most drivers should find that simply following the advice of these displays is the best course of action. This advice, however, need not be blindly followed. For example, if recent driving has been in flat terrain, the vehicle display indicates "fuel octane OK", and a trip pulling a trailer over steep mountain grades is planned, the driver may choose to fill up with a higher octane fuel. It is important to remember that the recommendation for the grade of fuel which should be selected for the next addition to the tank is based upon the driving conditions present during the previous tank of fuel.

BRIEF DESCRIPTION OF THE DRAWINGS

Additional advantages and features of the present invention will become apparent from the detailed description of the preferred embodiment which makes reference to the following set of drawings.

DETAILED DESCRIPTION OF THE PREFERRED EMBODIMENT

Figure 1:
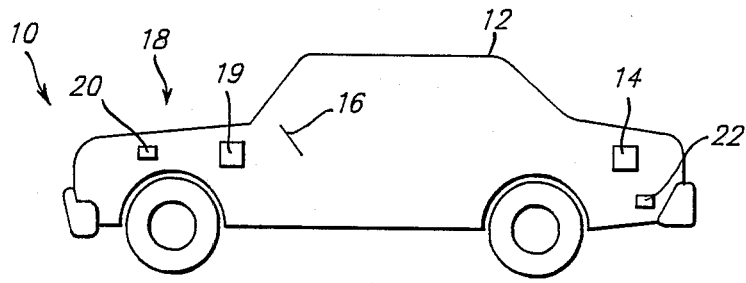
FIG. 1 shows fuel octane evaluation system hardware locations on an automobile.

FIG. 1 illustrates the general locations of system hardware components of a fuel octane evaluation system 10. An automobile 12 includes a fuel filler cap cover door assembly 14 which may be located on the left rear fender. A dashboard fuel gage 16 comprises a display device which may include incandescent lamps, liquid crystal displays, electroluminesence devices, a cathode ray tube or other display means. A detonation control system 18 comprises a conventional digital engine control computer 19 and a conventional detonation sensor 20. A gasoline gage tank unit 22 provides a signal which corresponds to the quality of fuel in the fuel tank of the automobile 12.

Figure 2:
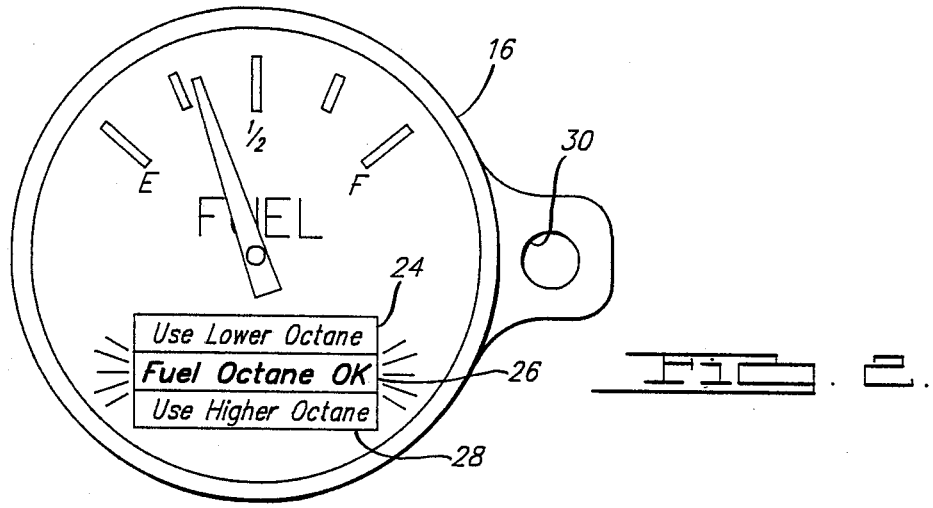
FIG. 2 shows a dashboard display for the fuel octane evaluation system shown in FIG. 1.

Referring now to FIG. 2, the dashboard fuel gage 16 is shown. Three displays or telltales 24, 26 and 28 are located near the fuel level display, each of which may be independently illuminated to display messages as illustrated. It will be appreciated that displays 24, 26 and 28 may comprise any number of conventional display means and may be driven by a conventional driving means such as commonly used in "check engine" displays. A push button switch 30 provides a means of requesting display of a fuel evaluation.

Figure 3:
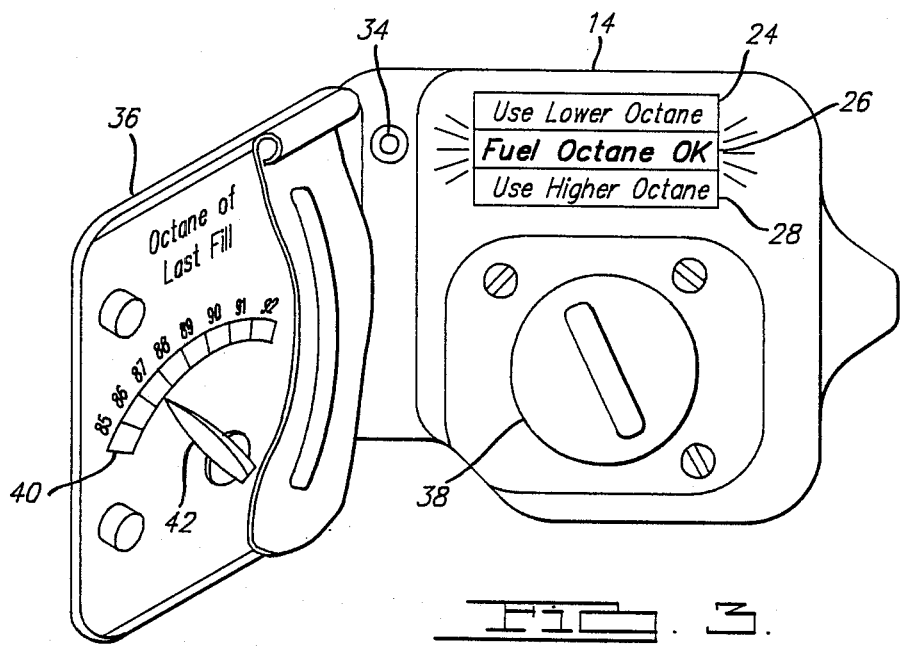
FIG. 3 shows a display located inside a gasoline tank fuel filler cap cover door for the fuel octane evaluation system shown in FIG. 1.

FIG. 3 shows a fuel filler cap cover door assembly 14. In one embodiment according to the present invention, the three telltales 24, 26 and 28 may be located in close proximity to a fuel filler cap 38. The fuel evaluation may be automatically displayed when a switch 34 is actuated upon the opening of a fuel filler cap cover door 36. An octane scale 40 and a manually operated friction loaded pointer 42 are shown mounted on the inside of the door 36 for recording the octane number of the most recent fuel addition to the tank. This recording may be easily compared with the fuel evaluation recommendation of the telltales 24, 26 or 28 when deciding what octane fuel to add. The pointer 42 may be reset to record the octane of the fuel added for future reference.

Modern digital ignition control systems typically compute spark advance with the use of a three dimensional may stored in read only memory. The value of spark advance output from the map is commonly called "base" spark advance. Also, a supplemental retard angle may be computed by the electronic detonation control system 18. The supplemental retard angle is then subtracted from the base spark advance, and the result of this subtraction determines the ultimate timing of spark plug firing. The value of the supplemental retard angle for each cylinder may be stored at a separate location or memory address in the electronic detonation control system. This stored value is updated frequently and may vary from zero to a maximum number called the maximum retard authority.

In one embodiment according to the present invention, the fuel octane evaluation system 10 will sense the utilization level of the detonation control system 18. When the utilization is above a first predetermined value, the fuel octane evaluation system 10 will activate a display which indicates the need for a higher octane fuel. When the accumulated supplemental retard angles are below a second predetermined value, a display will indicate that lower octane fuel may be used. When the utilization is between these two values, the display will indicate that the same octane fuel may be used.

Figure 4:
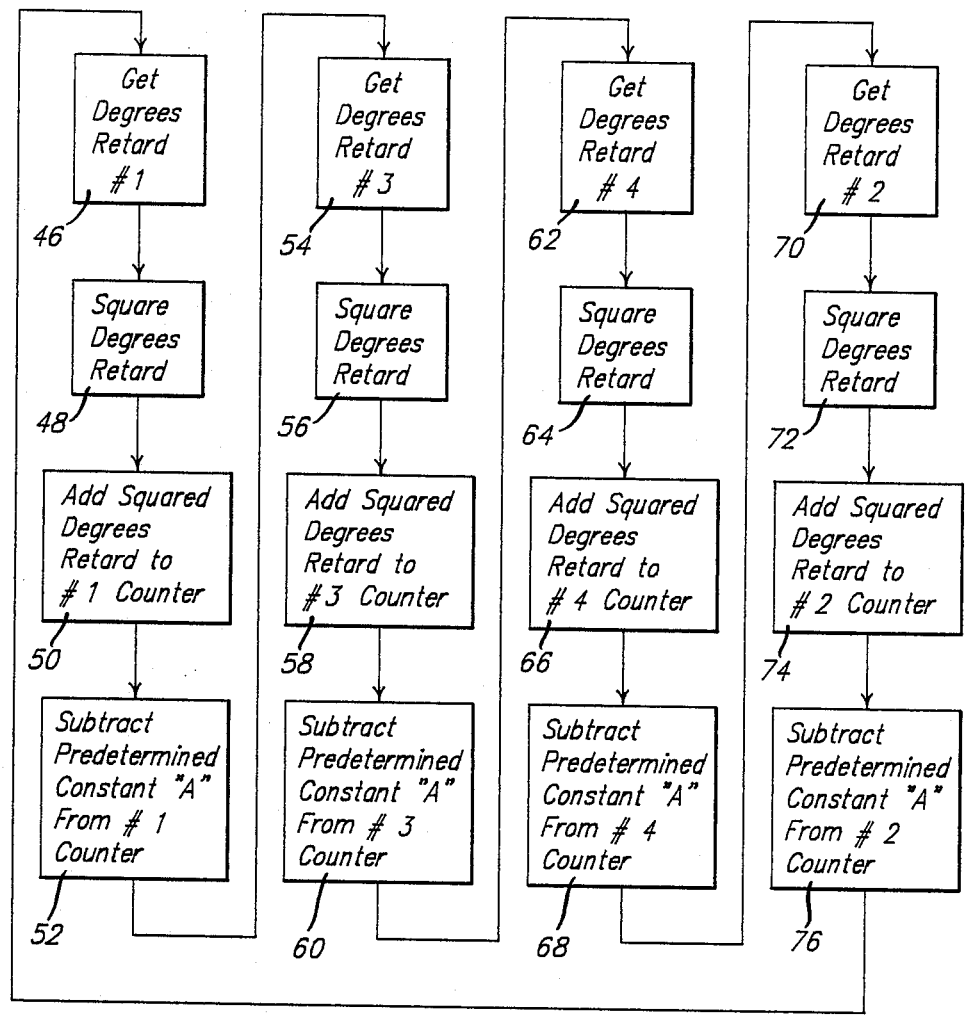
FIG. 4 is a flowchart of a computational loop for the fuel octane evaluation system shown in FIG. 1 adapted for use in a four cylinder engine.

Referring to FIG. 4, a computational loop 44 for the fuel octane evaluation system 10 is shown. The steps of this loop 44 are executed periodically and with sufficient frequency to obtain a valid sampling of the supplemental retard values prevailing in the detonation control system 18. This frequency depends upon, among other factors, the time constants of the particular detonation control system 18. For example, the steps of loop 44 may be executed once every 20 engine revolutions. It will be appreciated that engine revoltions may be counted by a conventional tachometer or by other means.

Figure 5:
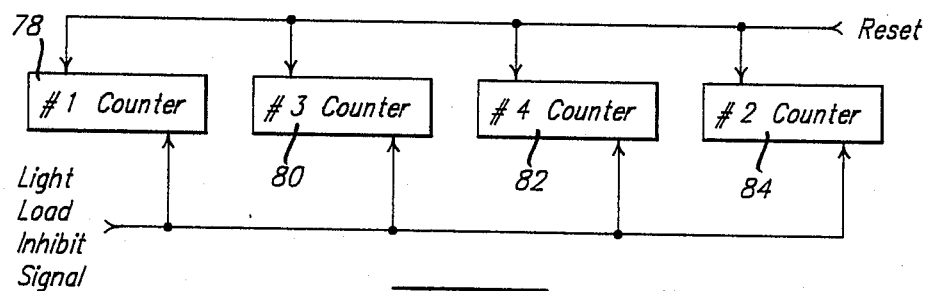
FIG. 5 shows four large capacity non-volatile counters or storage locations which accumulate outputs from the computational loop in FIG. 4.

More particularly, referring now to both FIG. 4 and FIG. 5 the computational loop 44 begins with the "get degrees retard #1" block 46. This value is the amount of supplemental retard in degrees imposed by the detonation control system 18 for cylinder #1 in a four cylinder engine. The value of supplemental retard is obtained from its assigned storage location or memory address in the engine control computer 19.

The next block in computational loop 44 is the "square degrees retard" block 48. This squaring results in a weighting of the retard value so that much greater importance is accorded to those values which approach the detonation control system's 18 maximum retard authority. It should be noted that functions other than a square law may be used. For example, because aluminum cylinder heads and blocks are known to be more susceptible to damage from detonation than cast iron, it may be desirable to use a cube function for an engine having an aluminum cylinder head.

The next step in flowchart 44 is labeled "Add squared degrees retard to #1 counter" 50. This step increments #1 counter 78, shown in FIG. 5, by the weighted value determined in block 48. It will be appreciated that the required size or capacity of counter 78 may be reduced by scaling the value obtained in the "get degrees retard block" 46. For example, the value may be divided by a constant.

Scaling is also achieved by the next block in the loop 44, labeled "subtract predetermined constant "A" from #1 counter" 52. In this step, a predetermined design constant "A" is subtracted from the #1 counter 78. If constant "A" is selected to be small, the number stored in the #1 counter 78 will tend to become larger and tend to make the fuel octane evaluation system 10 recommend a higher octane fuel sooner. Assuming that a higher octane fuel is supplied, there will be less frequent exercise of the detonation control system 18. As a result, the "degrees retard" number in block 46 will then lower and the #1 counter 78 will tend to stabilize, after a period of operation, at a lower value.

On the other hand, if constant "A" is selected to be large, the number stored in the #1 counter 78 will tend to become smaller and will tend to make the system recommend a lower octane fuel sooner. If a lower octane fuel is supplied, the result will be more frequent exercise of the detonation control system. Further, the "degrees retard" number in block 46 will be larger and the #1 counter 78 will tend to stabilize, after a period of operation, at a higher value.

The above discussion pertains to cylinder #1 in the engine of the vehicle 12. The same process takes place for the other three cylinders, thus, in computational loop 44, the other three columns 54–60, 62–68 and 70–76, correspond to the other three engine cylinders. Also, the results of these computations are fed to the other three counters 80, 82, and 84.

The time stability of the contents of the counters 78–84, as a percentage of their capacity, is affected by a number of factors. These factors include the capacity of the counters, the rapidity with which the steps in the computational loop 44 are selected, the value of constant "A" and the scaling of the numbers obtained by blocks 46, 54, 62 and 70. These factors may be selected so that, for example, a half hour of uninhibited operation with slightly excessively high octane fuel might run the counter down from the mid-range of its capacity to zero. In this same example, five minutes of operation with low octane fuel and with the detonation control system exercising its maximum retard, might run the counter from the mid-range of its capacity to full. The stability of the counter contents may be improved when the scaling of degrees retard and the value of constant "A" result in smaller numbers relative to the capacity of the counters.

In addition, larger capacity storage locations may be employed to improve stability of the counter operation. For example, precision programming of a non-volatile random access memory may be employed. In this arrangement, if a sixteen bit RAM is employed, the least significant sixteen bits may be assigned to a first address, the next more significant sixteen bits to a second address, etc. Predetermined constants "B" and "C", shown in FIG. 6, may then be selected such that their difference spans approximately the central one third of the maximum capacity of the counters. It will be appreciated that satisfactory operation of the fuel octane evaluation system 10 will depend on the expertise of the engineer/designer in selecting these scaling factors, constants, etc. Also, it would also be useful to verify system performance over wide ranges of operating conditions and octane numbers for each particular model automobile.

During periods of light load operation, such as steady state cruising at a legal speed on a level expressway, fuel octane is unimportant. Moreover, under such lightly loaded conditions, it is not possible to properly evaluate the octane requirement of the vehicle. Thus, under these conditions, it would not be appropriate to continuously subtract constant "A" from the value contained in the #1 counter 78. FIG. 5 illustrates a light load inhibit signal path leading to each of the counters 78-84. The effect of the inhibit signal is to freeze or prevent changes in the prevailing values stored in the counters.

The inhibit signal may be activated by several means such as when throttle angles are below a selected value, or when the intake manifold vacuum is above a selected value, as a function of throttle angle, manifold vacuum and engine speed, or when the storage locations for supplemental retard are empty.

Figure 6:
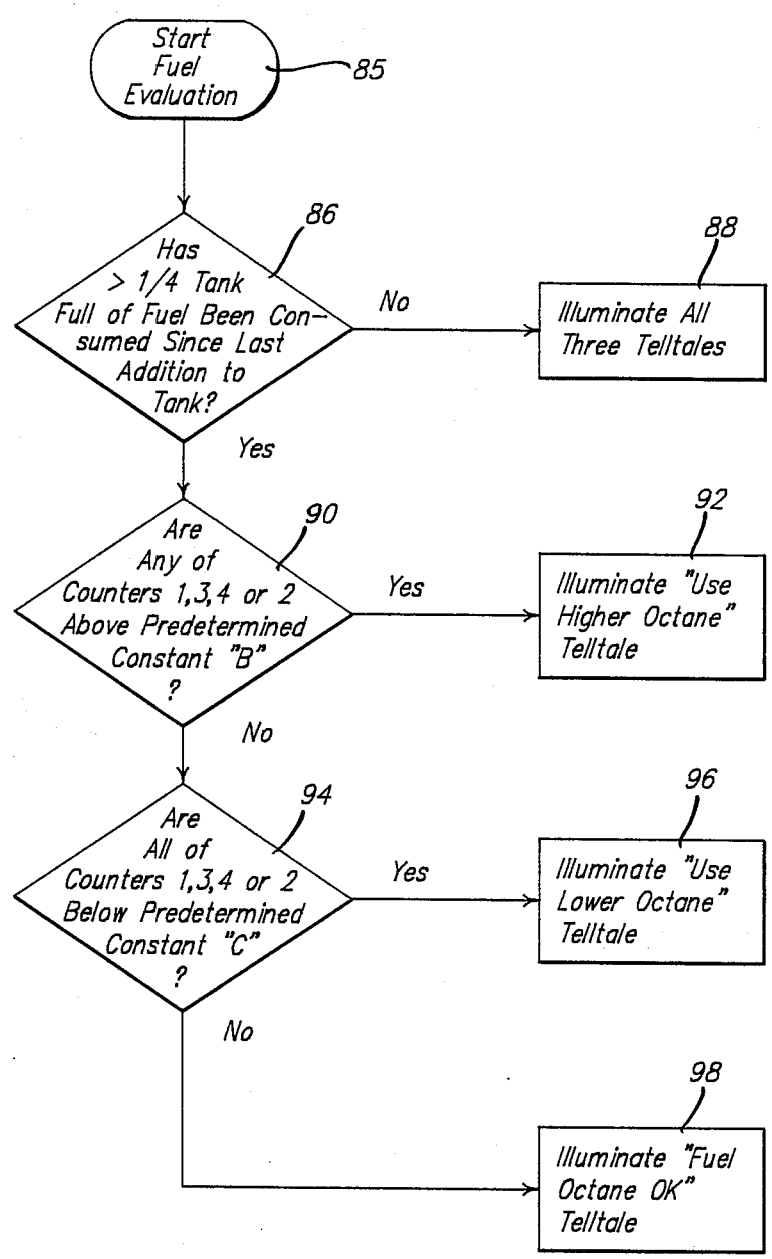
FIG. 6 is a flowchart of the logic used to update the telltales or displays shown in FIGS. 2 and 3.

The logic flow chart of FIG. 6 diagrams the fuel evaluation and display computation. This computation need be performed only occasionally. For example, it may be performed when the ignition switch is turned on but before the engine has been started. The driver will then notice which of telltales 24, 26 or 28 in FIG. 2 is illuminated. Because the information is not useful while driving, the telltales need not be illuminated while the engine is running. Alternatively, the driver may be required to request results of a fuel evaluation by pressing a button such as switch 30 as shown in FIG. 2.

Referring to FIG. 3, telltales 24, 26 and 28 may alternatively be located immediately above the fuel filler cap location so as to be visible from the outside during fueling. In this location, the fuel octane evaluation need be performed and the appropriate display illuminated only when the fuel filler door 36 is opened. The evaluation may be initiated by the switch 34 which is activated when the door 36 is opened.

Referring again to FIG. 6, the fuel evaluation logic is intended to evaluate the extent of exercise of the electronic detonation control system 18 over a predetermined period of time of operation. In accordance with the preferred embodiment, the period of operation is, at minimum, the time required to consume at least one quarter of a tank of gasoline. The evaluation is then accomplished by comparing the contents of the counters with two predetermined constants, "B" and "C", where "B" is larger than "C".

In particular, a "start fuel evaluation" block 85 is followed by a first decision diamond 86 where a determination is made of whether more than one quarter tank of fuel has been consumed since the most recent addition of fuel to the tank. A fuel tank level signal is generated by a conventional float operated gas gage tank unit 22 in the fuel tank of automobile 12 in FIG. 1. The fuel tank level signal may be stored in a non-volatile RAM each time the engine ignition switch is turned off. Each time the ignition switch is turned on, the value of the prevailing level signal is compared with the stored value. If the switch on value is significantly larger than the switch off value, it is assumed that fuel has been added to the tank and this new "filled level" is stored in non-volatile RAM until the next time fuel is added to the tank. Each time a new filled level is stored, a reset signal is sent to the counters 78, 80, 82 and 84 shown in FIG. 5. This reset signal stores a value in the counters midway between the values of predetermined constants "B" and "C".

In one embodiment according to the present invention, when the prevailing fuel level is higher than one quarter tank below the "filled level", the system will decide that there has not been sufficient experience to evaluate the appropriateness of the newly added tank of fuel. In such a case, if a fuel evaluation is requested, decision block 86 produces a "no" result, and block 88 may cause, for example, all three telltales to illuminate simultaneously to indicate that no recommendation can be made. It will be appreciated that since fuel has been added to the tank recently, it is not to be expected that a recommendation would be made or acted upon before a quarter tank of fuel has been consumed.

If the prevailing fuel level is below one quarter tank below the filled level, decision diamond 86 produces a "yes" result and the logic of FIG. 6 proceeds to a second decision diamond 90 where the contents of the counters 78, 80, 82 and 84 are examined to see if any of them are above constant "B". If the answer is "yes", it means that the electronic detonation control system 18 has been excessively exercised by at least one of the cylinders and block 92 illuminates the "use higher octane" telltale 28. If the answer is "no", the computation proceeds to a third decision diamond 94.

In the third diamond 94, the counters 78, 80, 82 and 84 are examined to see if the contents of each of them is below constant "C". If the answer is "yes", it means that the electronic detonation control system has been insufficiently exercised and block 96 will illuminate the "use lower octane" telltale 24. If the answer is "no", it means that the electronic detonation control system 18 has been utilized to a proper extent and block 98 will illuminate the "fuel octane OK" telltale 26.

It is important to the system engineering design that there exist a small range of octane numbers, say three of four, over which the system is capable of giving a "fuel octane OK" recommendation. In this way, a range of driving styles and loads can be accommodated when a given fuel octane is supplied.

It should be realized, however, that tank fuel will ordinarily be a blend of the fuels which have been recently added to the tank. Suppose, for example, that only two octane grades of fuel are available and it is the owner's practice to fill his tank when it becomes half empty. In circumstances where the two grades of fuel available differ by several octane numbers, the system may recommend "use higher octane fuel" at one fillup and then "use lower octane fuel" at the next fillup. This would lead the driver to effectively blend his own optimized fuel grade. On the other hand, if there is a more graduated selection of fuel grades available, the owner would be easily guided to a proper selection and be able to obtain a "fuel octane OK" advice after only a few fillups.

In accordance with the present invention, information regarding the recent operation of the fuel octane evaluation system 10 may also be useful in diagnosing engine malfunctions. For example, a record of the most recent ten or twenty fuel evaluations may be stored in a non-volatile stack in the computer's memory. This information may then be retrieved by electronic diagnostic equipment at a dealership or garage, to help in diagnosing engine complaints. Further, in the event of warranty claims, this information would provide evidence that the proper fuel either had or had not been supplied.

In another embodiment of the present invention, a fuel octane evaluation system is incorporated into a vehicle without an electronic detonation control system. In this system, a detonation sensor is attached to a counter which counts the number of detonations. The number of detonations from the counter is then fed to the flow chart in FIG. 4, instead of the degree retard. This information may then be processed in a manner as shown in FIGS. 4, 5 and 6. Accordingly, the vehicle driver will then be advised whether to use a higher, lower or the same octane fuel, based on the number of detonations which occured since fuel was last added to the tank.

It will be appreciated that the above disclosed embodiments are well calculated to achieve the aforementioned objectives of the present invention. In addition, it is evident that those skilled in the art, once given the benefit of the foregoing disclosure may now make modifications of this specific embodiment described herein without departing from the spirit of the present invention. Such modifications are to be considered within the scope of the present invention, which is limited solely by the scope and spirit of the appended claims.

What is claimed is:

1. For a motor vehicle, computational and display means for indicating to the vehicle operator the propriety of the grade of fuel which has been consumed by the vehicle in a recent time interval, said computational means including means for providing a comparative evaluation as to whether a grade of fuel should be used which is different from the grade of fuel which has been consumed in said recent time interval.

2. The system according to claim 1 wherein said grade of fuel is an octane rating.

3. The system according to claim 1 wherein said computational means is supplied with information relating to actual combustion in a combustion chamber of the engine.

4. The system according to claim 3 wherein said information relates to detonation.

5. The system according to claim 3 wherein said information includes information concerning engine detonation over a past time interval of operation.

6. Means for evaluating the suitability of the octane of a gasoline which has been supplied to a vehicle, said means comprising means for making an evaluation as to whether a timing spark retard control value of an electronic knock control system installed in the vehicle is above or below predetermined values during a recent time interval; and means for informing a vehicle operator of the result of said evaluation.

7. For a vehicle having an internal combustion engine, and an ignition means having a timing means for controlling the timing of said ignition, and an electronic detonation control means for retarding said ignition timing in response to engine detonation, a system for indicating to the operator of said vehicle the fuel octane requirement of said internal combustion engine comprising:
means for determining at least one retard value indicative of the extent of exercise of said electronic detonation control means;
means for performing a fuel octane evaluation of the fuel used in said vehicle by comparing said timing retard value with predetermined values related to the fuel octane needs of said engine.

8. The system according to claim 7 further including means for determining whether sufficient data are available to perform said fuel octane evaluation and means for indicating to the operator of said vehicle when insufficient data are available to perform said fuel octane evaluation.

9. The system according to claim 7 further comprising means for inhibiting the storing of data during periods of light load operation of said vehicle.

10. The system according to claim 7 where said detonation control means controls the timing of each cylinder separately in said internal combustion engine and said system determines and accumulates values of timing retard for each cylinder separately.

11. The system according to claim 7 additionally comprising means for initiating the evaluation of suitability of the octane rating of the fuel used including a fuel filler cap cover door and a switching means responsive to the opening of said fuel filler cap door.

12. The system according to claim 7 where said system additionally comprises means for advising the operator of said vehicle of the suitability of the octane rating of the fuel used in said vehicle.

13. The system of claim 12 where said means for advising comprises means for displaying a recommendation of whether a lower, higher or the same octane rating fuel should be used.

14. The system according to claim 13 further including means for recording the octane rating of the fuel last added to the tank whereby the operator may compare said fuel octane recommendation with the fuel octane rating of the fuel last added to the tank.

15. The system according to claim 7 wherein said determining means determines the values of timing retard imposed by said detonation control means and said system includes means for modifying said value of timing retard.

16. The system according to claim 15 where said means for modifying the value of timing retard includes means for arithmetically squaring the value of timing retard.

17. The system according to claim 7 additionally comprising means for accumulating values of timing retard imposed by said detonation control means and means for subtracting a predetermined constant from said accumulated value.

18. The system according to claim 17 where said subtracting is inhibited during periods of lightly loaded engine operation.

19. For a vehicle having an internal combustion engine, and an ignition means having a timing means for controlling the timing of said ignition, and an electronic detonation control means for retarding said ignition timing in response to engine detonation, a method for indicating to the operator of said vehicle the fuel octane requirements of said vehicle comprising:
determining the value of timing retard imposed by said detonation control means;
storing said timing retard value;
adding successive timing retard values to said stored timing retard value;
measuring the magnitude of said stored timing retard value;
determining the utilization level of said electronic detonation control means;
evaluating the suitability of the octane rating of the fuel used in said vehicle by comparing said utilization level with predetermined constants;
initiating said evaluation of the suitability of the octane rating of the fuel used; and
advising the operator of said vehicle of the suitability of the octane rating of the fuel used in said vehicle.

20. The method according to claim 19 further including the step of determining whether sufficient data is available to perform said fuel octane evaluation and the step of indicating to the operator of said vehicle when insufficient data are available to perform said fuel octane evaluation.

21. The method according to claim 19 further comprising the step of inhibiting the storing of said timing retard value during periods of light load operation of said vehicle.

22. The method according to claim 19 where said detonation control means controls the timing of each cylinder separately in said internal combustion engine and said step of determining the value of timing retard imposed by said electronic detonation control means includes the step of determining the value of timing retard for each cylinder separately.

23. The method according to claim 19 where said initiating step includes the step of activating a switch in response to the opening of a fuel filler cap cover door.

24. The method according to claim 19 where said step of advising the operator of the suitability of the octane rating of the fuel comprises the step of displaying a recommendation of whether a lower, higher or the same octane rating of fuel should be used.

25. The method of claim 19 further including the step of recording and displaying the octane rating of the fuel last added to the tank whereby the operator of said vehicle may compare said recommendation with the octane rating of the fuel last added.

26. The method according to claim 19 where the step of determining the value of timing retard further includes the step of modifying said value of timing retard.

27. The method according to claim 26 where said step of modifying the value of timing retard includes the step of arithmetically squaring the value of timing retard.

28. The method of claim 19 where said step of storing the timing retard value further includes the step of subtracting a predetermined constant from said stored value.

29. For a vehicle having an internal combustion engine, said engine being capable of detonating operation in said vehicle at least when operated under some conditions on some predetermined low octane fuel, and at least one sensor capable of detecting said detonating operation,
   means for determining a relationship between detonating operation time and non-detonating operating time when said engine is not lightly loaded;
   means for utilizing said relationship to evaluate suitability of the octane grade of a fuel supplied to said engine; and
   means for informing a vehicle operator of the result of said evaluation.

30. For a vehicle having an internal combustion engine operable on a liquid fuel, a fuel tank, a fuel gage tank unit, an engine control computer and an ignition switch, a method of determining if fuel has been added to said tank while said ignition switch is in its off position comprising:
   determining a first value of fuel level in said tank when said switch is turned off;
   storing said first value of said level in a non-volatile memory in said computer;
   determining a second value of said fuel level in said tank when said switch is turned on; and
   comparing said first value with said second value.

31. For a vehicle having an internal combustion gasoline engine, said engine being capable of detonating operation in said vehicle at least when operated under some conditions on some predetermined low octane fuel, and an engine control computer;
   means for evaluating the suitability of the octane grade of fuel supplied to said engine, said means for evaluating including means for determining whether a different grade of fuel should be supplied to said engine; and
   means for storing a historical record of said evaluations in a non-volatile memory of said computer.

* * * * *